(12) United States Patent
Kauranen et al.

(10) Patent No.: US 7,036,223 B2
(45) Date of Patent: May 2, 2006

(54) CABLING METHOD

(75) Inventors: Matti Kauranen, Espoo (FI); Mikko Himmanen, Routio (FI)

(73) Assignee: ABB OY, Helsinki (FI)

( * ) Notice: Subject to any disclaimer, the term of this patent is extended or adjusted under 35 U.S.C. 154(b) by 159 days.

(21) Appl. No.: 10/485,961

(22) PCT Filed: Oct. 14, 2002

(86) PCT No.: PCT/FI02/00804

§ 371 (c)(1),
(2), (4) Date: Feb. 6, 2004

(87) PCT Pub. No.: WO03/034563

PCT Pub. Date: Apr. 24, 2003

(65) Prior Publication Data

US 2004/0231153 A1    Nov. 25, 2004

(30) Foreign Application Priority Data

Oct. 15, 2001    (FI)    ................................ 20012004

(51) Int. Cl.
*H01R 43/00*    (2006.01)

(52) U.S. Cl. ............................ 29/854; 29/855; 29/856; 29/857

(58) Field of Classification Search .................. 29/825, 29/749, 857, 860, 863, 854, 855, 856
See application file for complete search history.

(56) References Cited

U.S. PATENT DOCUMENTS

| | | | | | |
|---|---|---|---|---|---|
| 3,739,076 | A | * | 6/1973 | Schwartz | ...................... 174/78 |
| 4,090,767 | A | * | 5/1978 | Tregoning | .................. 439/610 |
| 4,245,878 | A | | 1/1981 | Hall | |
| 4,380,117 | A | * | 4/1983 | Brandewie et al. | ........... 29/742 |
| 4,381,425 | A | * | 4/1983 | Maricevic et al. | ............ 174/93 |
| 4,404,743 | A | * | 9/1983 | Brandewie et al. | ........... 29/857 |
| 4,689,440 | A | * | 8/1987 | Morin | .......................... 174/19 |
| 4,881,321 | A | * | 11/1989 | Komuro | ...................... 29/861 |
| 4,932,110 | A | * | 6/1990 | Tanaka | ....................... 29/33 M |
| 5,665,939 | A | | 9/1997 | Jorgensen et al. | |

FOREIGN PATENT DOCUMENTS

GB    2287366    9/1995

* cited by examiner

*Primary Examiner*—Carl J. Arbes
(74) *Attorney, Agent, or Firm*—Dykema Gossett PLLC

(57) ABSTRACT

A cabling method especially for installing thick electric cables (1) for connection to electric devices (8), in which method the cables (1) are brought to a cabling space (3), fitted and supported in place, cut and stripped at necessary locations, and the desired cables are equipped with cable shoes (6) or connectors for installing to the electric device (8), in which case the cabling steps are, before connection to the electric device (8), performed mainly outside the electric device (8) to be connected by using a separately arranged cabling part (3) comprising said cabling space (3). The invention also relates to this cabling part.

3 Claims, 3 Drawing Sheets

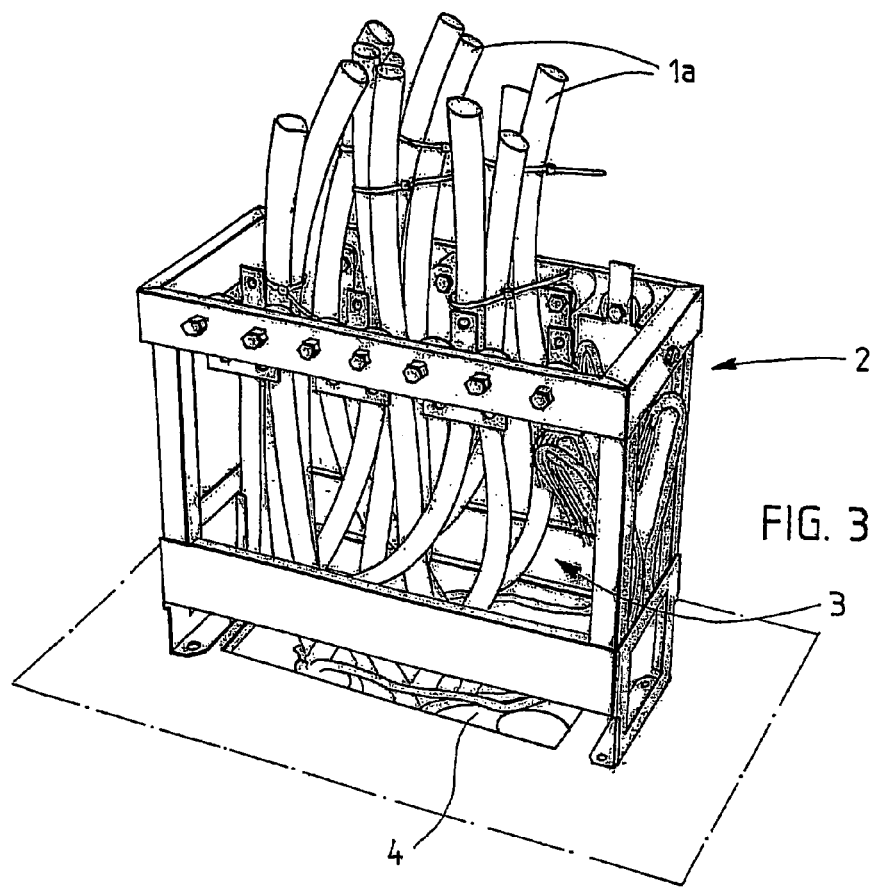
FIG. 3
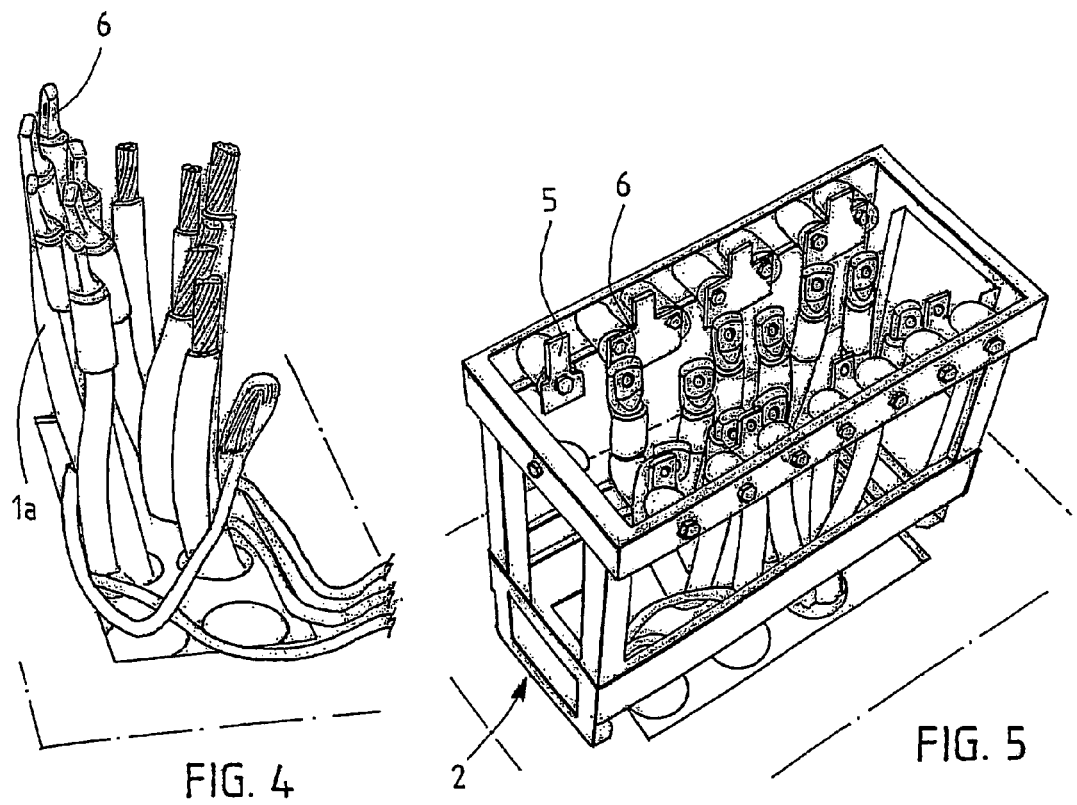
FIG. 4
FIG. 5

CABLING METHOD

BACKGROUND OF THE INVENTION

The invention relates to a cabling method especially for installing thick electric cables for connection to electric devices, in which method the cables are brought to a cabling space, fitted and supported in place, cut and stripped at necessary locations, and the desired cables are equipped with connectors for installing to the electric device. The invention also relates to a cabling space used in this method.

Thick cables are typically installed in a fixed manner to an electric device to be connected. In Europe, cables are generally brought from below through a separate cable channel or chute to the device to be connected. In America, the cables are typically brought from above. Both in Europe and America, the cabling space is a fixed part of the electric device, i.e. this space is set as part of the device. Cabling is done physically from the front of the device.

Cabling usually comprises the following work stages: first the cables are brought to the cabling space, they are supported in place and their detensioning is arranged, which detensioning can also be done from outside the cabling space. Cables are often brought through cable bushings, in which case electrical safety regulations may apply (for instance in the U.S. and England cable-specific bushings and/or wall tubes are used). In double-insulated cables, the outermost sheath is opened and stripped as required. The outer-most ground and protective cabling is wound to a ground wire. In addition, the apparatus may have ground wires of its own or inside the cable. The phase conductors of the cable and possible internal ground conductors are arranged, cut and stripped open as required. Next, cable shoes are pressed with manual or hydraulic presses to the phase and ground conductors or other suitable connectors are connected to them in some other manner. Finally, the cable shoes or connectors are connected by screw fastening to the appropriate connectors of the electric device in the cabling space.

Connectors are used especially in smallish, easily bendable cables, whereby a light and small device can be connected to the cables using connector counterparts belonging to the device. Alternatively, the connector is part of the device, in which case the device can be installed only after the cables have been tightened. In thick cables, regulations, standards and various instructions as well as the physical size and bendability of the cables set restrictions to this connection method.

Installation methods using connectors have been developed, in which the back part of a cabinet or enclosure are used in cabling an electric device. A common feature in these constructions is that cabling in done before the electric device is connected to the back part of the cabinet or enclosure protecting the device or to a separate cabling field that is electrically connected to a counterpart of a connector belonging to the device. After cabling, the electric device is brought to the enclosure by means of rails, slides, conductors or some other controls and set exactly in place, whereby the counterpart of the connector in the cabinet or enclosure touches the connector in the device. Constructions of this type are found for instance in Toshiba frequency transformers and Merlin Ger switches.

Standards defining the minimum space exist for the cabling space. Frequency transformer standards include the Canadian standard C22.2, U.S. standard UL508C and international IEC 61800-5 (draft). In known solutions, it is often in practice necessary to increase the dimensions of the cabling space to be considerably bigger than the minimum requirements of the standards.

The known cabling described above has several drawbacks. The large bending radius and mass of thick cables as well as their termination require space. Because cabling is done from the front of the device, the cables should be grouped either parallel in the installation direction and/or stepwise in elevation utilizing the longitudinal direction. Especially in a small installation space, the cables must be bent outside the device for clamping the cable shoes, whereby the space required by the cables in the longitudinal direction increases significantly.

Because cabling is thus a fixed part of the device, the replacement or repair of the device requires that the cables be detached or a detachable terminal connector be used. Because a terminal connector must be detached from the front of the device, it increases significantly the size of the device. Detaching cables is often difficult or even impossible, since the clamping of the cable shoes stiffens the cables even further and deformations during use hamper significantly the moving of the cables.

There are hundreds of different thick cable types in the world. Because their size, the cabling practice and regulations, connection methods and the dimensioning rules of cables also vary greatly, it is practically impossible to use universal connectors with thick cables. In addition, the price of cabling in comparison with the actual device is often high, and an exact definition of the cables is possible in limited cases only.

The same drawbacks as described above apply to cabling installed to a cabinet or the back part of an enclosure, since cabling is brought from the connector of the electric device to a separate fixed cable connection space. An advantage of this type of construction is that as a whole the depth of the cabinet can be better utilized and the replacement or repair of the device is easier. In addition, the device need not be installed during cabling, whereby this space can be utilized in cabling. A disadvantage in comparison with the present invention is that due to electrical safety, the detaching of an active device must be secured by a disconnector. This means that a device-specific switch or locking device is required that is coupled to the disconnector or switch by a separate mechanism. In addition, fixed cabling causes the same problems as described above.

BRIEF DESCRIPTION OF THE INVENTION

It is thus an object of the invention to develop a cabling method and cabling space suited for implementing the method in such a manner that the above problems are solved. This object is achieved by the method of the invention that is characterized in that the cabling steps mentioned earlier are, before connection to the electric device, performed mainly outside the electric device to be connected by using a separately arranged cabling part comprising said cabling space. Correspondingly, the cabling space of the invention is characterized in that the cabling space comprises a separate cabling part arranged completely outside the electric device to be connected.

The invention is based on the idea that the cabling required for connecting an electric device is performed for the required parts outside the electric device in question as an independent operation, and the cabling space used in this cabling is in a cabling part independent of the electric device.

In practice, if the electric device to be installed is reasonably easy to move and lift, the cabling part is arranged as a both mechanically and electrically completely separate and detachable part with respect to the electric device to be installed. This way, the device can be connected to the cabling part only after cabling, in which case the space reserved for the device can be utilized during cabling.

The solution of the invention provides the following advantages.

It is possible to implement the cabling in a small space. Only the physical dimensions of the cables and cable shoes or connectors determine the space required by cabling. The most significant space saving is achieved in the transverse direction of the incoming cable, which is usually the width and depth of the device. The incoming direction dimension of the cable, which is usually the height of the device, can also be reduced by optimizing the location of the bushings in relation to the connection points of the cables.

The phasing of the cables can be implemented transverse to the incoming cables on the basis of the device, in which case the optimization of the depth and width is mainly done on the basis of the device and not the cabling.

Cabling can be done using generally accepted cabling methods and tools without special tools.

The invention allows for similar variations as the prior art in complying with different regulations, instructions and standards concerning cabling and safety.

Because the cabling space is open during cabling, the termination of cables is substantially easier than in the present solutions.

A separately designed cabling part carries all forces caused by cables, so the basic device need not be designed to sustain them. This facilitates dimensioning and speeds up design, and the equipment will not become unnecessarily solid and expensive with respect to other operations.

Because cabling can be done separate from the electric device, it is possible to perform any other installation and building work around the device before connecting the device. This eliminates the need to protect the device unnecessarily during the work and avoids damage to it.

If the electric device to be installed needs to be replaced or repaired, it is substantially easier to detach the device than from a fixed mounting, since now the cabling needs not necessarily be handled at all. The device can be repaired elsewhere than at the installation site and the installation of a replacement unit is also easier and faster.

BRIEF DESCRIPTION OF THE FIGURES

The invention will now be described in greater detail by means of a preferred embodiment and with reference to the attached drawings, in which FIG. 3 shows conductors bent to their connection points and the definition of their cut-off points while the cabling part is in place, FIGS. 4 and 5 show the installation of connectors to conductors.

DETAILED DESCRIPTION OF THE INVENTION

Figure 1:
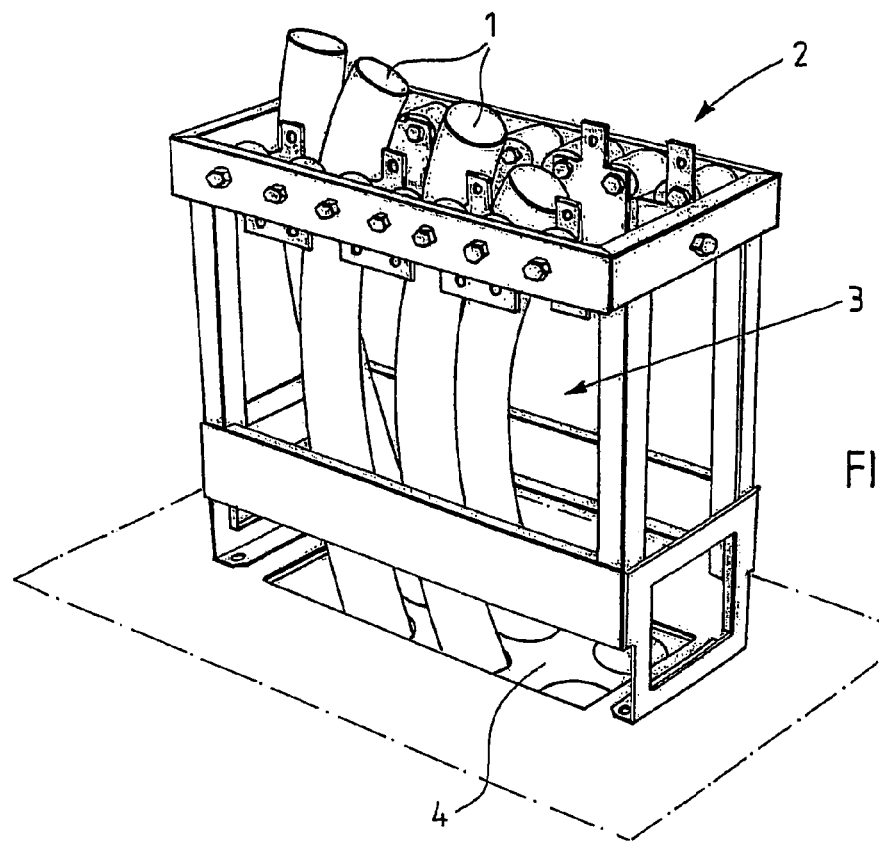
FIG. 1 shows a base plate connected to a cabling part and unstripped cables brought through it.

With reference to FIG. 1, at the initial stage of the cabling of the invention, the cables 1 are brought to the installation site through the floor or lifted from a cable channel to floor-level. At the same time, the cabling part 2 belonging to the invention, mechanically and electrically completely separate from the electric device 8 (FIG. 6) to be installed and forming a cabling space 3 is brought to the installation site around the cables 1. In this example, this cabling part 2 is made up of a metal frame open at the sides and on top that the cabling is finished is covered with appropriate lining plates (not shown in the figures). A base plate 4 connected to the cabling part 2 with any possible bushing adapters is at this stage installed and fastened to the floor implementing at the same time the tightness category required in the installation.

Figure 2:
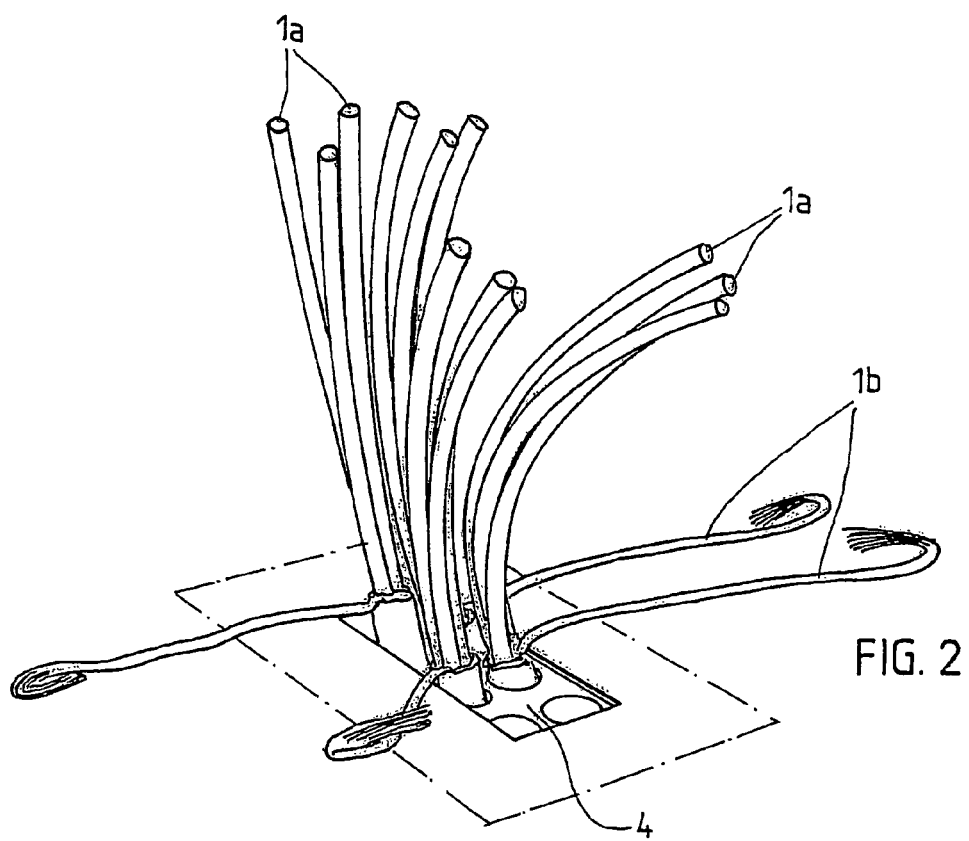
FIG. 2 shows a situation, where the cables are stripped and their outermost ground and protective cabling is wound to ground wires.

In FIG. 2, the cabling part 2 is moved aside so that the main cables 1 can be stripped and the revealed phase conductors 1a bent approximately to the positions where the connectors 5 of the cabling part 2 are. The stripped outermost ground and protective cabling of the cables 1 are wound to ground wires 1b. The groundings and the sealing of bushings are performed at this stage. The groundings are connected to the base plate 4 or to a separate point in the cabling part 2 made specifically for this purpose.

The correct cut-off point of the phase conductors 1a can be marked by setting the cabling part 2 in place as shown in FIG. 3. This is possible because the cabling part 2 is open on top. At the same time, it is possible to check that the conductors 1a are located correctly in width and depth. The cut-off point is determined on the basis of the type of the cables shoes 6 or connectors to be installed to the conductors 1a (FIGS. 4 and 5).

After the conductors 1a are set and marked as described above, the cabling part 2 is moved aside and the conductors 1a are cut. Next, the cable shoes 6 are installed as shown in FIGS. 4 and 5. Before the cable shoes 6 are clamped or tightened, the correct locations of the conductors 1a are checked by setting the cabling part 2 once more in place. This ensures that a bolted joint can be made. The cabling part 2 is again moved aside and the cable shoes 6 fastened to the phase conductors by clamping starting from the rearmost conductor so that the forwardmost conductors can be bent aside, if necessary. Clamping stiffens the cables so their bending is afterwards almost impossible.

The cabling part 2 is then installed permanently in place, i.e. fastened to the base plate 4 and/or floor and/or wall. From the top of the cabling part 2, i.e. from the direction of the electric device to be installed, the cable shoes 6 of the phase conductors 1a are connected to the corresponding connection points 5 of the cabling part 2 with bolted joints 7.

Figure 6:
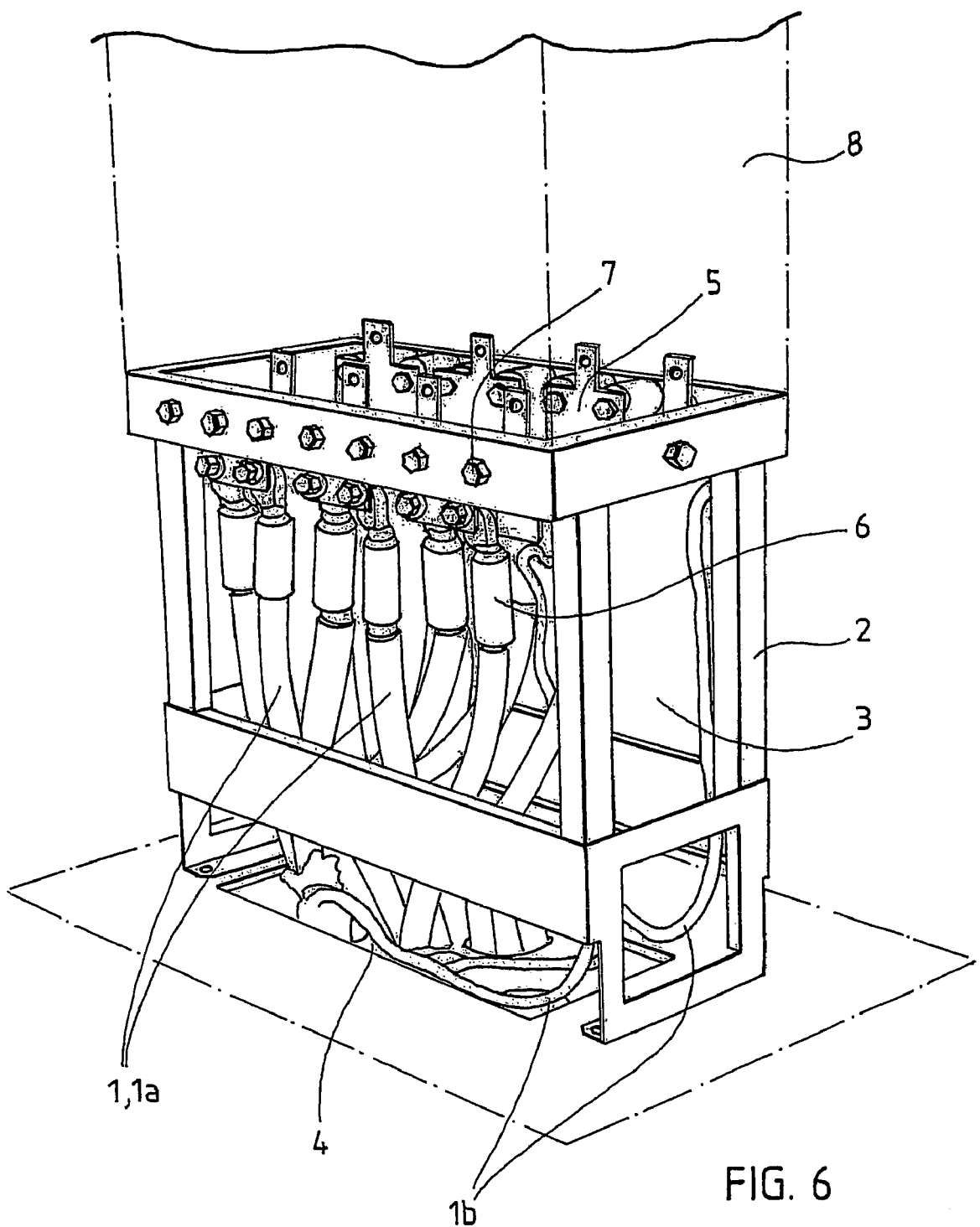
FIG. 6 shows finished cabling with the cabling part (without its lining plates) installed in place and an electric device lifted on top of the cabling part.

Now cabling is finished and the electric device 8 can be installed on top of the cabling part 2 and mechanically fastened to it as shown in FIG. 6. If necessary, the device 8 is also fastened at the top to the wall of the installation space.

The electric coupling of the cabling to the device 8 is done with bolted joints. This work phase is performed from the front by means of a long-handled socket wrench. Combiscrews and nuts pressed to strip terminals (not shown in the figures) can be used in the joint.

The above description of the invention is only intended to illustrate the basic idea of the invention. A person skilled in the art may, however, implement the method according to the basic idea of the invention with the related devices in a variety of ways. The invention and its embodiment are thus not limited to the example described above, but its details may vary within the scope of the attached claims. Consequently, the invention is in no way limited to the incoming direction of the cables, even though they typically come from below or above. Cabling and device installations may take place in a different order than described above. The thickness of the cables is not limited, but the advantages of the invention are more pronounced with thick, stiff cables. The placement of the connection points of the cabling part can differ from what is shown in the figures of the drawings. Only the cables, cable shoes and connectors, tools and various electrical safety regulations, rules and standards set restrictions to the placement. Some of the connections can also be fixed directly or by means of a connector to the electric device. This may facilitate situations in which both thin, flexible cables and thick, stiff cables are installed in the device. However, the repair and service of the device is then typically more difficult.

The invention claimed is:

1. A method for connecting a plurality of insulated electrical cables to an electric device comprising the steps of:
    (a) providing a cabling device which defines an internal cabling space through which the plurality of cables can extend and which includes connectors for connection to the electric device,
    (b) supporting the plurality of cables so that free ends thereof are accessible and extend through the cabling space of the cabling device,
    (c) removing the cabling device from around the free ends of the plurality of cables,
    (d) stripping insulation from around the free ends of at least some of the insulated electrical cables so as to expose internal phase conductors,
    (e) cutting at least some of the phase conductors to predetermined lengths,
    (f) attaching cable shoes to free ends of the phase conductors,
    (g) positioning the cable device around the free ends of the phase conductors,
    (h) attaching the cable shoes at the fee ends of the phase conductors to the cabling device, and
    (i) attaching the cabling device and the electric device together.

2. A method according to claim 1, including between steps (h) and (i) a step of securing the cabling device to a support surface.

3. A method according to claim 2, wherein said support surface is a flooring surface.

* * * * *